March 26, 1968  C. P. PORTERFIELD ET AL  3,375,468
CONTROL DEVICE FOR AN INDUSTRIAL HEATING OSCILLATOR
Filed Aug. 12, 1964  6 Sheets-Sheet 1

INVENTORS.
CECIL P. PORTERFIELD &
GEORGE A. KAPPENHAGEN
BY
Tilberry & Body
ATTORNEYS March 26, 1968  C. P. PORTERFIELD ET AL  3,375,468
CONTROL DEVICE FOR AN INDUSTRIAL HEATING OSCILLATOR
Filed Aug. 12, 1964

FIG. 4

| PLATES IN COIL | INDUCTANCE UNITS |
|---|---|
| A B C | 1+1+1+1 = 4 |
| A B | (2 X 2)+1+1 = 6 |
| A C | (2 X 2)+1+1 = 6 |
| B C | (2 X 2)+1+1 = 6 |
| B | (2 X 2)+(2 X 2) = 8 |
| A | (3 X 3)+1 = 10 |
| C | (3 X 3)+1 = 10 |
| NONE | (4 X 4) = 16 |

INVENTORS.
CECIL P. PORTERFIELD &
GEORGE A. KAPPENHAGEN
BY
Tilberry & Body
ATTORNEYS

INVENTORS.
CECIL P. PORTERFIELD &
GEORGE A. KAPPENHAGEN
BY
Tilberry & Body
ATTORNEYS

March 26, 1968  C. P. PORTERFIELD ET AL  3,375,468
CONTROL DEVICE FOR AN INDUSTRIAL HEATING OSCILLATOR
Filed Aug. 12, 1964  6 Sheets-Sheet 6

INVENTORS.
CECIL P. PORTERFIELD &
GEORGE A. KAPPENHAGEN
BY
Tilberry & Body
ATTORNEYS

United States Patent Office 3,375,468
Patented Mar. 26, 1968

3,375,468
CONTROL DEVICE FOR AN INDUSTRIAL
HEATING OSCILLATOR
Cecil P. Porterfield and George A. Kappenhagen,
Cleveland, Ohio, assignors to Park-Ohio Industries, Inc., a corporation of Ohio
Filed Aug. 12, 1964, Ser. No. 389,077
3 Claims. (Cl. 331—169)

This invention pertains to the art of industrial heating and more particularly to a control device for an industrial heating oscillator.

The invention is particularly applicable to a device for controlling a power oscillator used for induction heating and it will be described with particular reference thereto; however, it will be appreciated that the invention has much broader applications and may be used in a device for controlling a power oscillator of the general type used in other industrial heating installations, such as dielectric heating apparatus.

The term "industrial heating" as used herein refers to the art of increasing the temperature of a substance or workpiece for processing, annealing, hardening, melting or for other similar purposes.

A power oscillator for an industrial heating apparatus generally includes a vacuum tube having a plate, grid and cathode, or analogous elements, a high voltage DC source connected across the plate and cathode of the tube and external circuit components to cause the vacuum tube to generate a high frequency output. In accordance with the contemplation of the present invention, the external circuit components of the power oscillator include an antiresonant circuit, generally referred to as a tank circuit, having a primarily inductive reactance branch, hereinafter referred to as the inductive branch, and a primarily capacitive reactance branch, hereinafter referred to as the capacitive branch, with the plate-cathode circuit of the oscillator tube being connected in parallel with each of these branches.

Since the total reactance in the inductive branch of the tank circuit equals the total reactance in the capacitive branch at the oscillating frequency, the equivalent circuit of the tank circuit, as viewed from the oscillator tube, is primarily a pure resistance load having a resistance value, known as the antiresonant resistance of the tank circuit. The antiresonant resistance is dependent upon (a) the quality factor, Q, of the tank circuit and (b) the reactance of either the inductive branch or the capacitive branch of the tank circuit.

The antiresonant resistance of the tank circuit, hereinafter designated as $Rar$, is a primary factor in the design of a power oscillator for industrial heating. This aspect of oscillator design can best be illustrated by an example. If the antiresonant resistance of the tank circuit is 1,000 ohms and the desired input power to the oscillator tube is 100 kw., the plate current and DC plate voltage rating of the oscillator tube is selected to obtain the 100 kw. input power with an output resistance of 1,000 ohms. For example, a tube having plate voltage rating of 10,000 volts and a plate current rating of 10 amperes would allow an input power of 100 kw. with an antiresonant resistance of 1,000 ohms.

After the oscillator tube has been selected having the proper plate voltage rating and plate current rating, any change in the antiresonant resistance of the tank circuit will lower the maximum input power to the oscillator tube. This is a well-known phenomenon in the field of industrial heating. However, it can be appreciated by reference to the example given above, if the antiresonant resistance of the tank circuit decreases, for instance if the antiresonant resistance drops to 500 ohms, the plate current will reach the tube rating of 10 amperes when the plate voltage is only 5,000 volts. Since the plate current of the oscillator tube cannot be increased substantially beyond its rating, the input power to the oscillator would be approximately 50 kw. This is a 50% drop in the input power to the oscillator tube which causes a corresponding drop in the output power of the oscillator.

The same reduction in the input power to the oscillator tube is caused by an increase in the antiresonant resistance of the tank circuit. For instance, if the antiresonant resistance is increased to 2,000 ohms, the plate voltage rating of 10,000 volts is reached when the plate current is only 5 amperes. Thus, the input power to the oscillator tube would be only 50 kw. Consequently, the antiresonant resistance of the tank circuit, as viewed by the vacuum tube in the oscillator, must be maintained substantially constant to obtain a maximum input power to the oscillator and, thus, a maximum output power for the oscillator.

In an industrial heating installation of the type described, the load usually includes a coil positioned around, or adjacent to, a workpiece which is to be inductively heated. This coil is connected, either directly or through a coupling transformer, in series within the inductive branch of the tank circuit. The load is primarily inductive and it contributes substantially to the value of the antiresonant resistance of the tank circuit as viewed by the oscillator tube; therefore, as the electrical characteristics of the load vary, the Q and the antiresonant resistance of the tank circuit change and, thus, limit the input power of the oscillator in the manner described above.

In the past, efforts have been made to maintain the antiresonant resistance of the tank circuit constant with changes in the Q of the tank circuit. For instance, in oscillators having an output frequency of approximately 400 kc., it has been suggested that a variable inductor be used in the inductive branch of the tank circuit so that the inductance of this inductor could be adjusted to compensate for changes in the Q of the tank circuit when the electrical characteristics of the load changed. It is known that in a parallel resonant circuit $Rar = X_L \times Q = X_C \times Q$ wherein $X_L$ is the inductive reactance of one parallel branch and $X_C$ is the capacitive reactance of the other branch. When the Q of the tank circuit increased, the inductor was adjusted to remove inductance from the inductive branch, and when the Q decreased, the inductor was adjusted to insert inductance into this branch of the tank circuit. This arrangement was not satisfactory. When the inductance of the tank circuit was changed by adjusting the inductor, the resonant frequency of the tank circuit changed so that the output frequency of the oscillator was determined somewhat by the setting of the adjustable inductor. This change in the output frequency of the oscillator caused error in the calculation of the heating time and other factors surrounding the use of the oscillator. The error was increased with large variations in the output frequency of the oscillator. Also, the inserted variable inductor could not provide a sufficient range of adjustment to compensate for the normal variation of the tank circuit Q.

In an oscillator having a higher oscillating frequency, i.e. in the 1–4 megacycle range, it was common practice to provide a variable capacitor in the capacitive branch of the tank circuit. This arrangement was not successful because the output frequency of the oscillator was changed when the capacitor was adjusted to compensate for variations in the electrical characteristics of the load. Also, the range of the adjustment of the variable capacitor did not allow for sufficient adjustment of the tank circuit to compensate for the normal variation in the Q of this circuit.

These and other disadvantages are overcome by the present invention which is directed toward a control for a power oscillator that maintains a relatively constant antiresonant resistance, as viewed by the oscillator, even when the Q of the tank circuit varies considerably and without substantially changing the output frequency of the oscillator unless a frequency change is desired. If a frequency change is wanted, the frequency may be varied in accordance with any desired program as the control is operated to compensate for changes in the Q of the tank circuit.

In accordance with the present invention there is provided an improvement in an oscillator for an industrial heating apparatus which oscillator includes a tube with a plate, grid and cathode and a tank circuit including a primarily inductive branch and a parallel, primarily capacitive branch, an inductive load in one of the branches and the plate-cathode circuit of the tube being connected in parallel with each of the branches. The improvement in accordance with the present invention includes means for maintaining a substantially constant antiresonant resistance across the plate-cathode circuit of the tube with variations in the Q of the tank circuit, this means comprises a first device for changing the effective inductive reactance in the inductive branch inversely proportional to variations in the Q of the tank circuit and a second device for changing the effective capacitive reactance in the capacitive branch in direct proportion to the change in the inductive reactance.

By providing such an arrangement for a power oscillator of the type used for industrial heating, the antiresonant resistance, as viewed by the tube, can remain constant with substantial variations in the Q of the tank circuit.

In accordance with another aspect of the present invention, the first and second devices as defined above are so correlated that the inductance and capacitance of the tank circuit when adjusted by the devices maintain a substantially constant value for the square root of the product of the inductance and capacitance.

In accordance with a further aspect of the present invention there is provided a method for maintaining a substantially constant antiresonant resistance of a tank circuit in an oscillator for induction heating installation with changes in the Q of the tank circuit, the tank circuit having a primarily inductive reactance branch with an inductive load therein and a primarily capacitive branch, the method comprising the steps of: adjusting the inductive reactance of the inductive branch inversely proportional to a change in the Q of the tank circuit and adjusting the capacitive reactance of the capacitive branch in proportion to the change of inductance in the inductive branch so that the antiresonant resistance of the tank circuit is substantially constant irrespective of the change in the Q of the tank circuit.

In accordance with another aspect of the present invention, the method as defined above includes the step of maintaining a constant value for the square root of the product of the inductance and capacitance of the tank circuit as the inductive and capacitive reactance are adjusted.

In accordance with another aspect of the present invention, there is provided a variable inductance coil for an industrial heating device comprising a multiturn coil, at least one highly conductive shielding member and means for moving the member between adjacent turns of the coil to change the effective inductance of the coil.

A primary object of the present invention is the provision, in an industrial heating, vacuum tube oscillator, or analogous oscillator, of an apparatus and method for controlling the antiresonant resistance of the tank circuit of the oscillator, as viewed by the plate circuit of the vacuum tube, which apparatus and method accurately control the antiresonant resistance with large variations in the Q of the tank circuit.

Another object of the present invention, is the provision, in an industrial heating, vacuum tube oscillator, or an analogous oscillator, of an apparatus and method for controlling the antiresonant resistance of the tank circuit of the oscillator, as viewed by the plate circuit of the vacuum tube, which apparatus and method are economical to incorporate in the oscillator and are dependable during extended use.

Another object of the present invention is the provision, in an industrial heating, vacuum tube oscillator, or an analogous oscillator, of an apparatus and method for controlling the antiresonant resistance of the tank circuit of the oscillator, as viewed by the plate circuit of the vacuum tube, which apparatus and method allows control of the antiresonant resistance with large variations in the Q of the tank circuit and without unwanted deviations of the oscillating frequency of the oscillator.

Still another object of the present invention is the provision, in an industrial heating, vacuum tube oscillator, or an analogous oscillator, of an apparatus and method for controlling the antiresonant resistance of the tank circuit of the oscillator, as viewed by the plate circuit of the vacuum tube, which apparatus and method allows control of the antiresonant resistance with large variations in the Q of the tank circuit so that the antiresonant resistance may remain substantially constant with widely varying loads in the tank circuit.

Yet another object of the present invention is the provision, in an industrial heating, vacuum tube oscillator, or an analogous oscillator, of an apparatus and method for controlling the antiresonant resistance of the tank circuit of the oscillator, as viewed by the plate circuit, which apparatus and method changes the reactance of both branches of the tank circuit to compensate for changes of Q in the tank circuit so that the antiresonant resistance may be held constant with these changes in the Q of the tank circuit.

Yet a further object of the present invention is the provision, in an industrial heating, vacuum tube oscillator, or an analogous oscillator, of an apparatus and method for controlling the antiresonant resistance of the tank circuit of the oscillator, as viewed by the plate circuit of the vacuum tube, which apparatus and method changes the reactance of both branches of the tank circuit to compensate for changes of Q in the tank circuit without changing the square root of the product of the inductance and capacitance in the tank circuit so that the antiresonant resistance may be held constant with these changes in the Q of the tank circuit without changing the oscillating frequency of the tank circuit.

Still a further object of the present invention is the provision, in an industrial heating, vacuum tube oscillator, or an analogous oscillator, of an apparatus and method for controlling the antiresonant resistance of the tank circuit of the oscillator, as viewed by the plate circuit of the vacuum tube, which apparatus and method allows maximum input power to the oscillator irrespective of the electrical characteristics of the load in the tank circuit.

Yet another object of the present invention is the provision of an apparatus and method as defined above which changes the effective inductive reactance in one branch of the tank circuit and the effective capacitive reactance in the other branch of the tank circuit to maintain the antiresonant resistance of the tank circuit constant with changes in the Q of the tank circuit.

Another object of the present invention is the provision of a variable inductance coil for an industrial heating device which coil can be easily adjusted over a large range of inductances without requiring taps.

Still a further object of the present invention is the provision of a variable inductance coil for an industrial heating device which coil includes at least one highly conductive shielding member that is movable between the turns of the coil to control the inductance across the coil.

These and other objects and advantages will become apparent from the following description used to illustrate the preferred embodiment of the invention as read in connection with the accompanying drawings in which.

Figure 1:
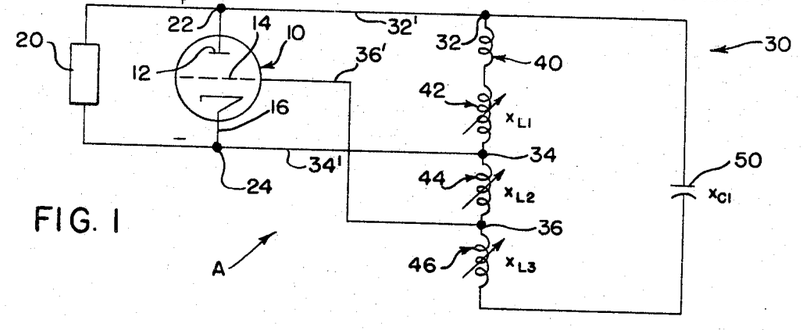
FIGURE 1 is a schematic wiring diagram illustrating the preferred embodiment of the present invention.

Referring now to the drawings wherein the showings are for the purpose of illustrating preferred embodiments of the invention only and not for the purpose of limiting same, FIGURE 1 schematically illustrates a vacuum tube oscillator A of the general type used in industrial heating. The oscillator includes a vacuum tube 10 with a plate 12, grid 14 and cathode 16. It is appreciated that other types of vacuum tubes could be used in the oscillator A. The tube 10 is illustrated as a triode for the purposes of simplicity, without any attempt to limit the scope of the invention thereto. Tube 10 is provided with an input 20 which takes the form of a DC voltage supply in combination with other operating components, such as resistors and capacitors, not shown. The plate circuit or plate-cathode circuit of tube 10 is connetced between terminals 22, 24 which are utilized to connect the output of the tube to a tank circuit 30. Plate terminal 32, cathode terminal 34 and grid terminal 36 of circuit 30 are connected onto the plate, cathode and grid of tube 10 by conductors 32', 34' and 36', respectively.

In accordance with the preferred embodiment of the present invention, as shown in FIGURE 1, the tank circuit 30 includes a load coil 40 which is schematically represented as an induction coil; however, it is appreciated that the load generally includes resistance, as well as inductance. In practice, the load coil 40 is the primary of a coupling transformer and the actual load is connected onto the secondary of the transformer; however, for simplicity, the load can be illustrated as being directly connected within the tank circuit 30. The load or coil 40 is utilized for raising the temperature of a substance by induction heating, dielectric heating or a similar heating process. The preferred embodiment of the present invention is utilized to raise the temperature of the substance by induction heating; therefore, the coil 40, or a similar coil on the output side of a coupling transformer, is positioned adjacent or around the substance being heated so that as the oscillator A casues an oscillating current flow through the coil 40, the substance juxtaposed to the coil is heated in a manner well known in the field of induction heating.

In accordance with the preferred embodiment of the present invention as shown in FIGURE 1, tank circuit 30 includes variable inductor 42, having an inductive reactance $X_{L1}$, variable inductor 44, having an inductive reactance $X_{L2}$, variable inductor 46, having an inductive reactance $X_{L3}$, and a fixed capacitor 50 having a capacitive reactance of $X_{C1}$. It is appreciated that the reactances of the components within the tank circuit will vary with variations in the oscillating frequency of the tank circuit; however, unless a variable frequency is desired, the oscillating frequency of the tank circuit will be maintained substantially constant in a manner to be hereinafter described in detail.

Tank circuit 30 includes a primarily inductive branch having load coil 40 and inductor 42 and a primarily capacitive brach having inductors 44 and 46 and capacitor 50. These branches are connected by conductors 32', 34' across the plate circuit of tube 10 so that the tube is in parallel with both branches of the tank circuit. The tank circuit has a resonant frequency, and the tube 10, when viewing the tank circuit 30 across terminals 32, 34, will see a primarily pure resistance, which is known as the antiresonant resistance, $R_{ar}$, of the tank circuit. As explained before, this antiresonant resistance must remain substantially constant to provide maximum output power to the tank circuit 30 and to the load coil 40.

During operation of the oscillator A, the electrical characteristics of the load coil 40, especially the resistance thereof, often change drastically; therefore, the Q of circuit 30 will change and the antiresonant resistance, as viewed from tube 10, will also change. This change in the antiresonant resistance causes a reduction in the amount of power which the oscillator A can direct to the load coil 40. In the past, it was common practice to adjust an inductor in the inductive branch of tank circuit 30 or a capacitor in the capacitive branch of tank circuit 30 to compensate for changes in the antiresonant resistance of the tank circuit, as viewed across terminals 32 and 34. Such arrangements did not provide a wide range of compensation; therefore, the oscillator A was often operating at a reduced output power. In addition, when changing the inductance of the inductive branch or the capacitance of the capacitive branch, the square root of the product of the inductance and capacitance in the tank circuit would be changed with the obvious result that the operating frequency of the oscillator A was changed. This was another disadvantage of the previous arrangements for compensating for changes in the antiresonant resistance of the tank circuit in an industrial heating oscillator, such as oscillator A.

Figure 2:
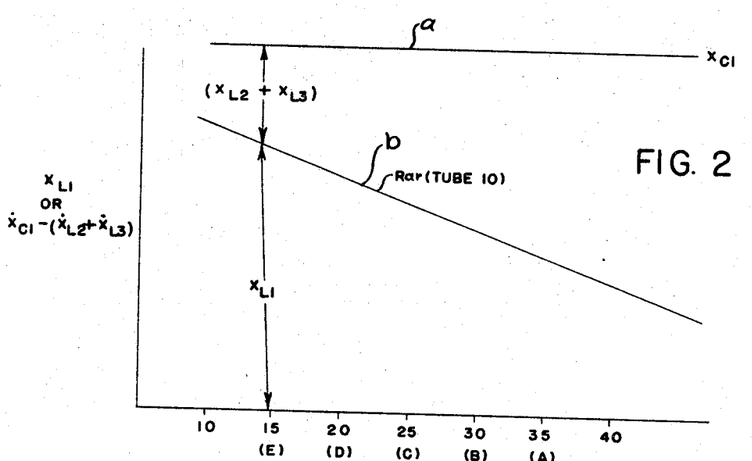
FIGURE 2 is a graph illustrating the operating characteristics of the preferred embodiment shown in FIGURE 1.

In accordance with the preferred embodiment of the present invention as shown in FIGURE 1, changes in the electrical characteristics of load coil 40 are compensated for by adjusting the inductor 42 and the inductor 46. The amount of adjustment is preselected so that the same antiresonant resistance will be imposed across the tube 10. The operating characteristics of the preferred embodiment shown in FIGURE 1 are illustrated in the graph of FIGURE 2. Since the capacitive reactance of capacitor 50 remains substantially constant, the value of this reactance ($X_{C1}$) is exhibited as horizontal line $a$. By appropriate calculations which will vary according to the desired operating characteristics of tube 10 and its electrical characteristics, a line $b$ is constructed on the graph in FIGURE 2. Line $b$ represents the adjusted value of inductor 42 ($X_{L1}$) for various values of the Q of the tank circuit 30. The values for the inductive reactance, i.e. the coordinate of the graph, are not included because they will vary according to the desired characteristics of the tube 10. The difference between the value on line $a$ and the value on line $b$ for any Q value, shown on the abscissa of the graph, will represent the summation of the inductive reactances ($X_{L2}$ and $X_{L3}$) of inductors 44 and 46. It is noted that the inductors 44 and 46 are within the capacitive branch of the tank circuit 30; therefore, they vectorially subtract from the capacitive reactance ($X_{C1}$) of the capacitor 50 so that the inductive reactance of the inductive branch, represented by the value of line $b$, equals the effective capacitive reactance of the capacitive branch, i.e. the fixed capacitive reactance ($X_{C1}$) of capacitor 50 minus vectorially the summation of the inductive reactances ($X_{L2}$ and $X_{L3}$) of inductors 44 and 46.

When load coil 40 changes in electrical characteristics so that the Q of tank circuit 30 changes, the inductor 42 is adjusted to match the coordinate value of line $b$ directly above the changed Q value. If the capacitive branch of the tank circuit were not changed at this time, the frequency of the tank circuit would be changed because the value of the square root of the product of the new inductance and the fixed capacitance of the tank circuit would be different. In accordance with the present invention, after inductor 42 is changed to correspond with line $b$ of the graph in FIGURE 2, the inductor 46 is also changed to make the vectorial summation of the inductance of inductors 44 and 46 equal to the difference between lines $a$ and $b$ in the graph. By this arrangement, inductance is reallocated in the tank circuit without changing the total inductance of this circuit. Thus, the total inductance within circuit 30 can be maintained the same when the amount of reactance within the inductive and capacitive branches is changed. Accordingly, the present invention contemplates a shifting of the feed points between lines 32' and 34' so that the inductance is shifted between the inductive and capacitive branches without changing the total amount of the inductance within circuit 30. This aspect is illustrated in the practical embodiment shown in FIGURES 15–17. Consequently, a change or readjustment in the antiresonant resistance across the lines 32' and 34' is accomplished without causing a variation in the oscillating frequency of oscillator A. The variable inductor 44 is used primarily for changing the grid voltage of tube 10 so that oscillation will take place. The adjustment of inductor 44 is relatively minor in comparison with the other adjustments of inductors 42 and 46 and it will be hereinafter discussed in detail.

In summary, the inductance within tank circuit 30 may be maintained relatively constant as the inductive reactance in the inductive branch is changed. This is accomplished by a corresponding change of the inductance within the capacitive branch. After the adjustment is made, the inductive reactance of the inductive branch still equals the effective capacitive reactance of the capacitive branch and the same amount of capacitance and inductance are included within the tank circuit 30 so that the square root of the product of the inductance and capacitance of the tank circuit and, thus, the frequency of oscillation of the tank circuit are the same. This is a substantial advance over other methods of compensating for variations in the electrical characteristics of load coil 40 within the tank circuit 30.

In accordance with the preferred embodiment of the present invention, there is provided a variable tap arrangement for changing the inductance of variable inductors 42 and 46 as shown in FIGURE 1. This arrangement is illustrated schematically in FIGURE 3 wherein inductor 42 has taps 60–68 with a movable contact 61 and inductor 46 has taps 70–78 with a movable contact 71. The various taps of inductors 42, 46 are lettered to correspond with the value of the Q of circuit 30 as shown in the graph of FIGURE 2. When the Q of circuit 30 is low (E position) the inductive reactance of inductor 42 ($X_{L1}$) as indicated by line $b$ in the graph of FIGURE 2, is relatively high so the contact 61 engages tap 60 which inserts the maximum inductance within the inductive branch between lines 32' and 34'. In like manner, the inductive reactance of inductor 46, as indicated between lines $a$ and $b$ of the graph in FIGURE 2 is relatively small; therefore, the contact 71 is positioned on tap 70 so that a very small amount of the coil of inductor 46 is within the inductive branch of the circuit 30.

As the quality factor increases, the inductive reactance in the inductive branch of circuit 30 must be decreased as dictated by line $b$ in the graph of FIGURE 2. This is accomplished by changing the contact 61 to a higher numbered tap. In a like manner, the capacitive reactance within the capacitive branch must be decreased. This is accomplished by adding more inductance at the variable inductor 46 by moving contact 71 to a higher numbered tap. The movement of contacts 61 and 71 may be done independently; however, in accordance with the preferred embodiment of the present invention, the contacts 61, 71 are moved in unison by a physical connector 60a between these two contacts (see also FIGURES 15–17). Consequently, in practice, as the quality factor of tank circuit 30 is changed by variation in the electrical characteristics of the load, the contacts 61, 71 are shifted to the closest setting corresponding to the new Q value so that the antiresonant resistance, viewed from the tube 10, is relatively constant. Also, since there is no substantial change in the total amount of inductance or capacitance within the circuit 30, the resonant frequency of the tank circuit is maintained relatively constant.

After making the appropriate changes to compensate for a change in the antiresonant resistance, as viewed by tube 10, which is equivalent to a change in the Q of circuit 30, it is often found that the grid voltage of tube 10 is not at the proper level. If the grid voltage is too high, the inductance of inductor 44 must be decreased and if the grid voltage is too low, the inductance of inductor 44 must be increased. The amount of adjustment of inductor 44 is relatively small when compared to the amount of adjustment of inductors 42 and 46 and it is accomplished by a further aspect of the present invention.

Figure 3:
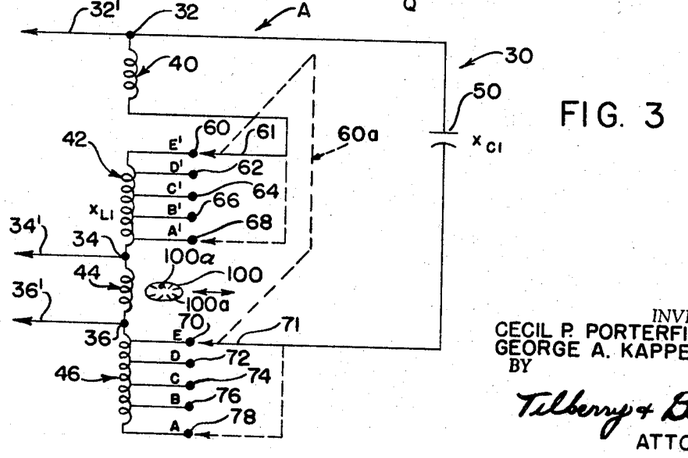
FIGURE 3 is a schematic, wiring diagram illustrating a further aspect of the preferred embodiment of the present invention.
Figure 4:
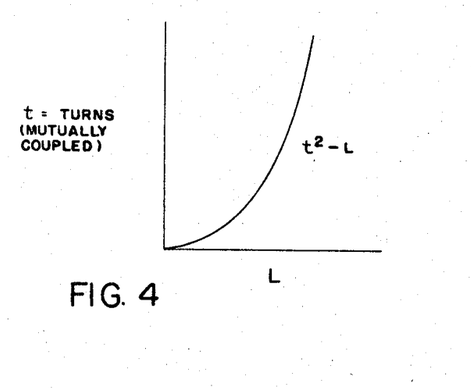
FIGURE 4 is a graph illustrating the operating characteristics of a variable inductance coil having variable turns.

In FIGURE 4 there is a conventional "coil-turn inductance" curve which shows that the inductance of a multi-turn coil is proportional to the square of the number of turns in the coil, i.e. $L=Kt^2$. The square function of the inductance is explained by the mutual inductance between adjacent turns of a multi-turn coil. In accordance with the aspect of the present invention utilized to adjust the inductance of inductor 44, one or more highly conductive disks 100 are positioned on an appropriate mechanism so that the disks may be moved between adjacent turns of the inductor 44. The adjustment may be accomplished by positioning the disk or disks eccentrically on a shaft so that rotation of the shaft will move the disk or disks between the turns of the coil of inductor 44. Each disk is provided with a plurality of radially extending slits 100a to prevent eddy current circulation within the disks. See FIGURE 3.

Figure 5:
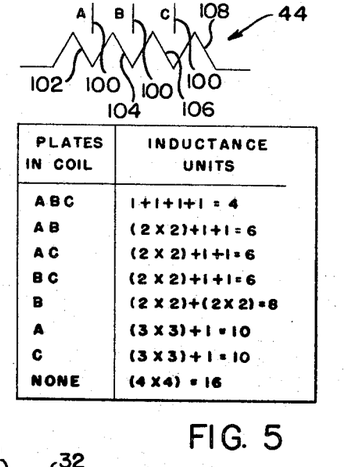
FIGURE 5 is a schematic representation of a further aspect of the present invention with a tabular chart of the operating characteristics thereof.

The operating characteristics of this aspect of the present invention are shown in FIGURE 5 wherein the coil of inductor 44 is represented as having four separate turns 102, 104, 106 and 108 with three disks 100, being designated as disks A, B and C, being selectively movable into and out of the space between adjacent turns of the coil. As the disks move between adjacent turns, the mutual inductance between these adjacent turns is substantially eliminated so that the square function as set forth in FIGURE 4 no longer exists. Appreciating this feature of moving the disks between the turns, the operating characteristics of the disks A, B and C will be hereinafter described in detail.

Referring to the tabular material of FIGURE 5, if disks A, B and C are all positioned between the turns of coil 44, there is no mutual inductance between the turns and each turn will have an inductance value corresponding to its own inductance, which can be represented as a single unit. Consequently, four inductance units would be measured across inductor 44 if all disks are positioned between the turns of the coil as shown in FIGURE 5. To show a contrast, if none of the disks were positioned between the turns of the coil, all turns would exhibit mutual inductance with respect to each other and, as shown in the graph of FIGURE 4, the inductance units would be $4^2$ or 16. By selectively moving the various disks into or out of the coil 44, inductance units between 4 and 16 can be obtained as shown in the table of FIGURE 5. Consequently, by the use of one or more highly conductive disks movable between adjacent turns of the coil of inductor 44, a wide range of effective inductance of the coil can be accomplished. This general arrangement is used to change the inductance, and thus the voltage, across inductor 44 so that the grid voltage of oscillator A can be properly adjusted after the inductors 42 and 46 have been changed to compensate for changes in the Q of tank circuit 30. If it is desired to obtain an inductance across inductor 44 which is between a value shown in the table of FIGURE 5, one or more of the disks may be moved partially into the coil to obtain an inductance between the inductances set forth in the table.

Figure 6:
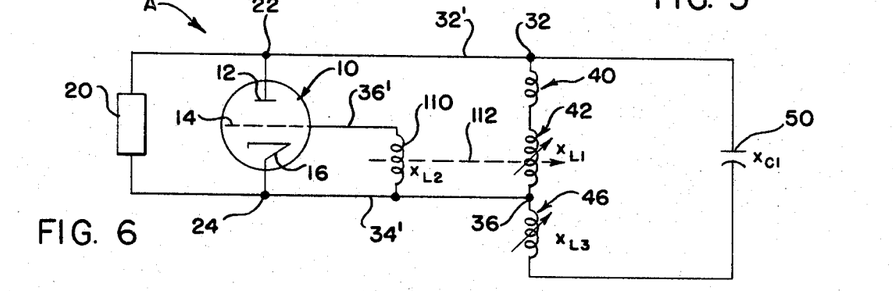
FIGURES 6–14 are schematic wiring diagrams illustrating modifications of the preferred embodiment as shown in FIGURE 1.

Referring now to FIGURE 6, a further embodiment of the present invention is illustrated wherein inductor 110 is out of the tank circuit and is inductively coupled with inductor 42. The coupling between these inductors is adjusted by coupling member 112. The operation of this embodiment of the present invention is substantially identical to the operation of the embodiment shown in FIGURE 1; however, the grid voltage is controlled by adjusting member 112 instead of by the use of movable disks as described in connection with the preferred embodiment of the invention.

Figure 7:
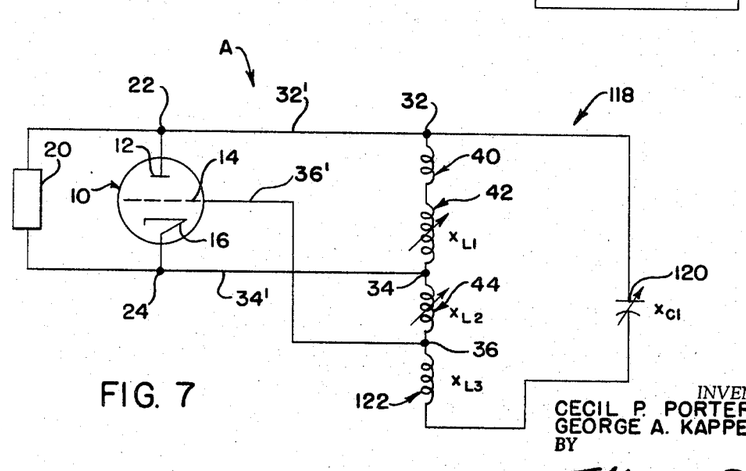

Referring now to FIGURE 7, a further embodiment of the present invention is illustrated wherein tank circuit 118 includes an inductive branch having inductor 42 and load coil 40 and a capacitive branch having inductor 44, variable capacitor 120 and fixed inductance 122. In accordance with this embodiment of the invention, when changing electrical characteristics of load coil 40 cause a change in the Q of circuit 118, the inductive reactance of the inductive branch is changed by adjustment of inductor 42 in a manner similar to the previous embodiments of the invention. The capacitive branch of circuit 118 has the effective capacitive reactance varied by changing the capacitance of capacitor 120 instead of adjusting inductor 122. Since the inductive and capacitive reactances of the parallel branches must remain equal after the adjustment, the inductance of inductor 42 must be adjusted in the opposite direction than the capacitance of capacitor 120; therefore, by appropriate programming the square root of the product of the inductance and reactance of circuit 118 can remain substantially constant for different adjustments of the inductor 42 and the capacitor 120. In this manner, the antiresonant resistance, as viewed by tube 10, remains constant and the frequency of the oscillator does not change appreciably.

Figure 8:
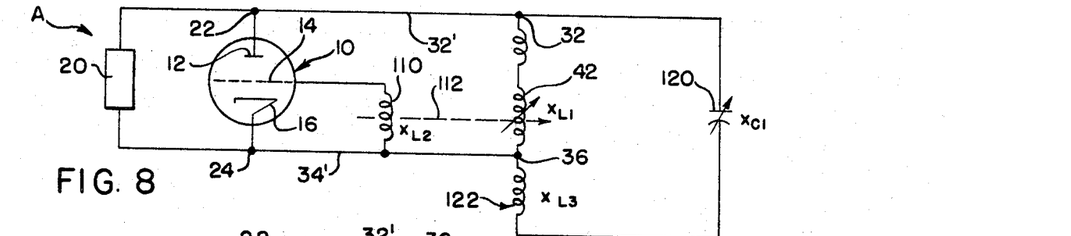

FIGURE 8 illustrates a slight modification of the circuit as shown in FIGURE 7 with an inductance coupling for supplying the grid voltage in a manner similar to the embodiment of the invention shown in FIGURE 6. A detailed explanation of this embodiment of the invention has been eliminated for the purposes of simplicity since it has been discussed in connection with FIGURES 6 and 7.

Figure 9:
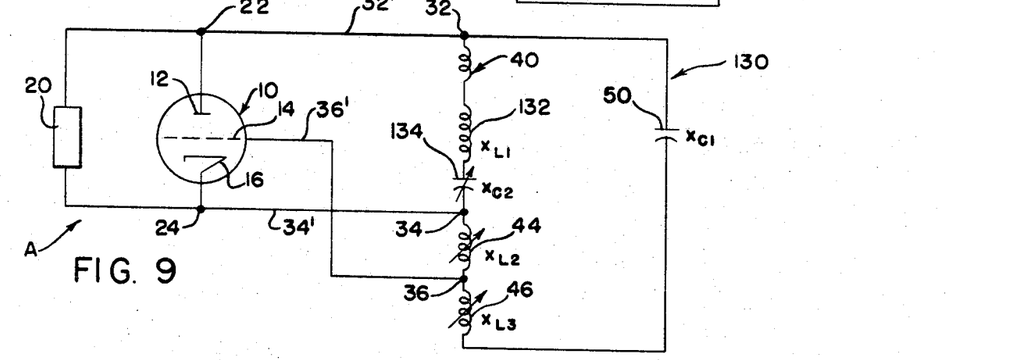

Referring to FIGURE 9, a further embodiment of the present invention is illustrated. Tank circuit 130 includes, in the inductive branch, the load coil 40, fixed inductor 132 and variable capacitor 134 and in the capacitive branch, fixed capacitor 50 and adjustable inductors 44, 46. The inductive reactance within the inductive branch is the vector summation of the inductance of inductor 132 and the capacitance of capacitor 134 and this effective inductance reactance can be varied by adjustment of the capacitor 134. The adjustment in the capacitive branch is identical to the adjustment of this branch as shown in FIGURE 7. The operation of the embodiment shown in FIGURE 9 does not differ substantially from the other embodiments; therefore, a detailed explanation is omitted for the purposes of simplicity.

Figure 10:
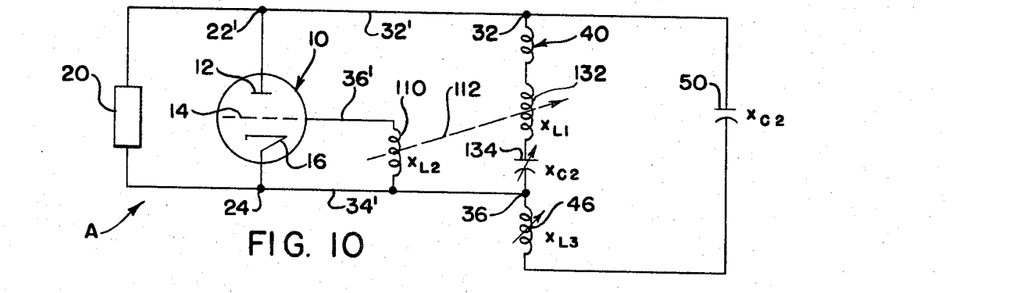

The embodiment of the invention shown in FIGURE 10 is essentially the same as the embodiment shown in FIGURE 9 with the exception that the grid voltage is obtained by mutual inductance between coil 110 and inductor 132. The mutual inductance can be varied by member 112 in a manner similar to the embodiment shown in FIGURE 6.

Figure 11:
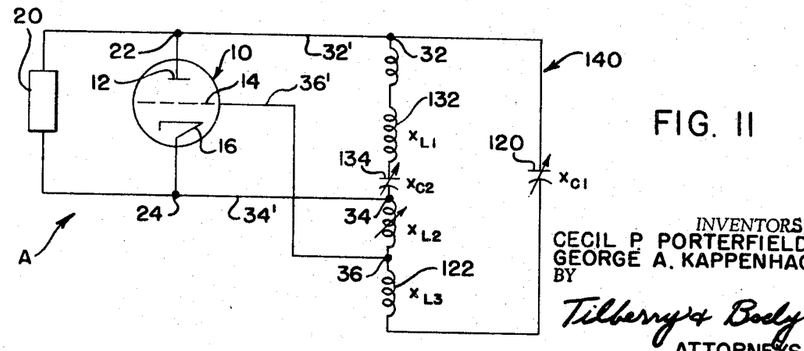
Figure 12:
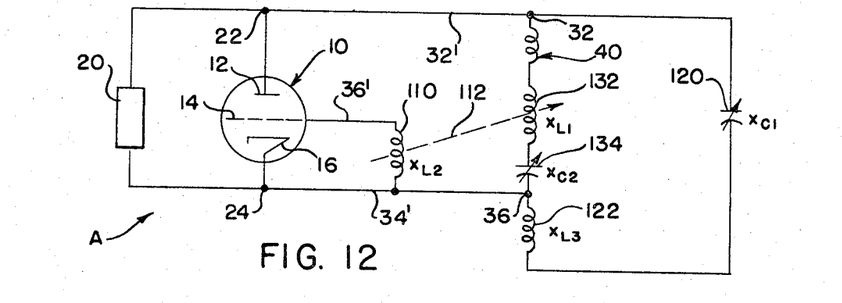

A further embodiment of the present invention is shown in FIGURE 11 wherein the inductive branch of tank circuit 140 is somewhat identical to the inductive branch of circuit 130 in FIGURE 9 and the capacitive branch of circuit 130 is somewhat identical to the capacitive branch as shown in FIGURE 7. In this embodiment of the invention, the effective inductive reactance of the inductive branch is controlled by an adjustable capacitor 134 and the effective capacitive reactance of the capacitive branch is adjusted by the variable capacitor 120. FIGURE 12 shows a further modification of the invention substantially the same as the embodiment shown in FIGURE 11 with the exception that the grid voltage is obtained across coil 110 which is inductively coupled with inductor 132 and the mutual coupling is adjustable by member 112 in a manner similar to the adjustment of the coupling shown in FIGURE 6.

Figure 13:
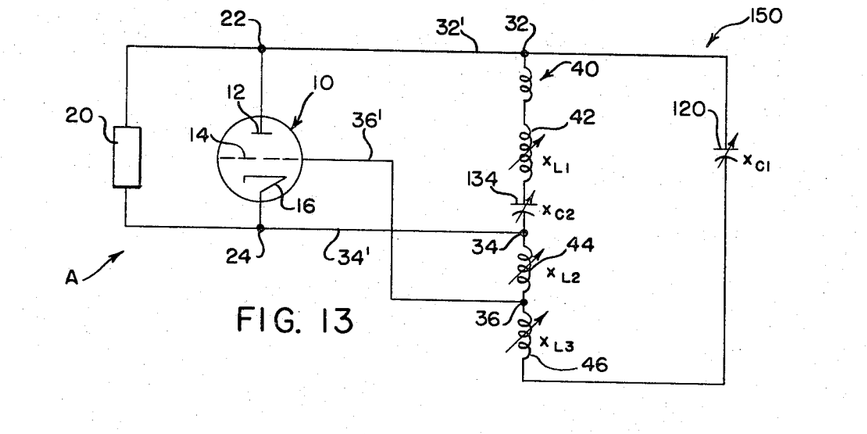
Figure 14:
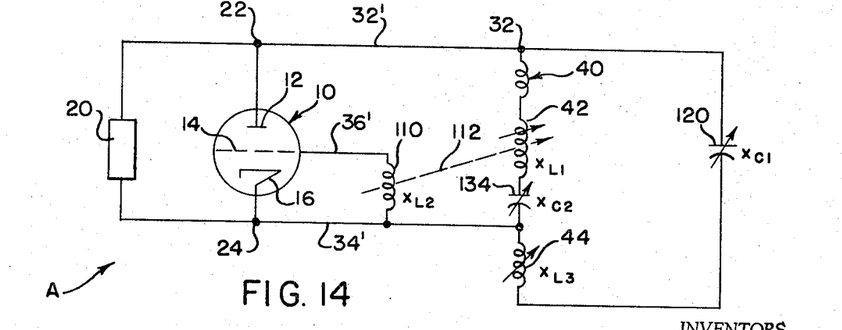

Still a further embodiment of the present invention is shown in FIGURE 13 wherein the inductive branch of tank circuit 150 includes the load coil 40, variable inductor 42 and variable capacitor 134 and the capacitive branch includes variable inductor 44, variable inductor 46 and variable capacitor 120. In this embodiment of the invention, each branch of the circuit 150 is controlled by adjusting both an inductor and a capacitor; therefore, extreme flexibility is accomplished in adjusting the tank circuit of the oscillator to obtain a relatively constant antiresonant resistance for widely varying electrical characteristics of the load coil 40. FIGURE 14 illustrates an embodiment of the invention substantially identical to the embodiment shown in FIGURE 13 with the exception that the grid voltage is obtained across coil 110 which is mutually coupled with inductor 42 so that the mutual coupling can be adjusted by member 112.

Figure 15:
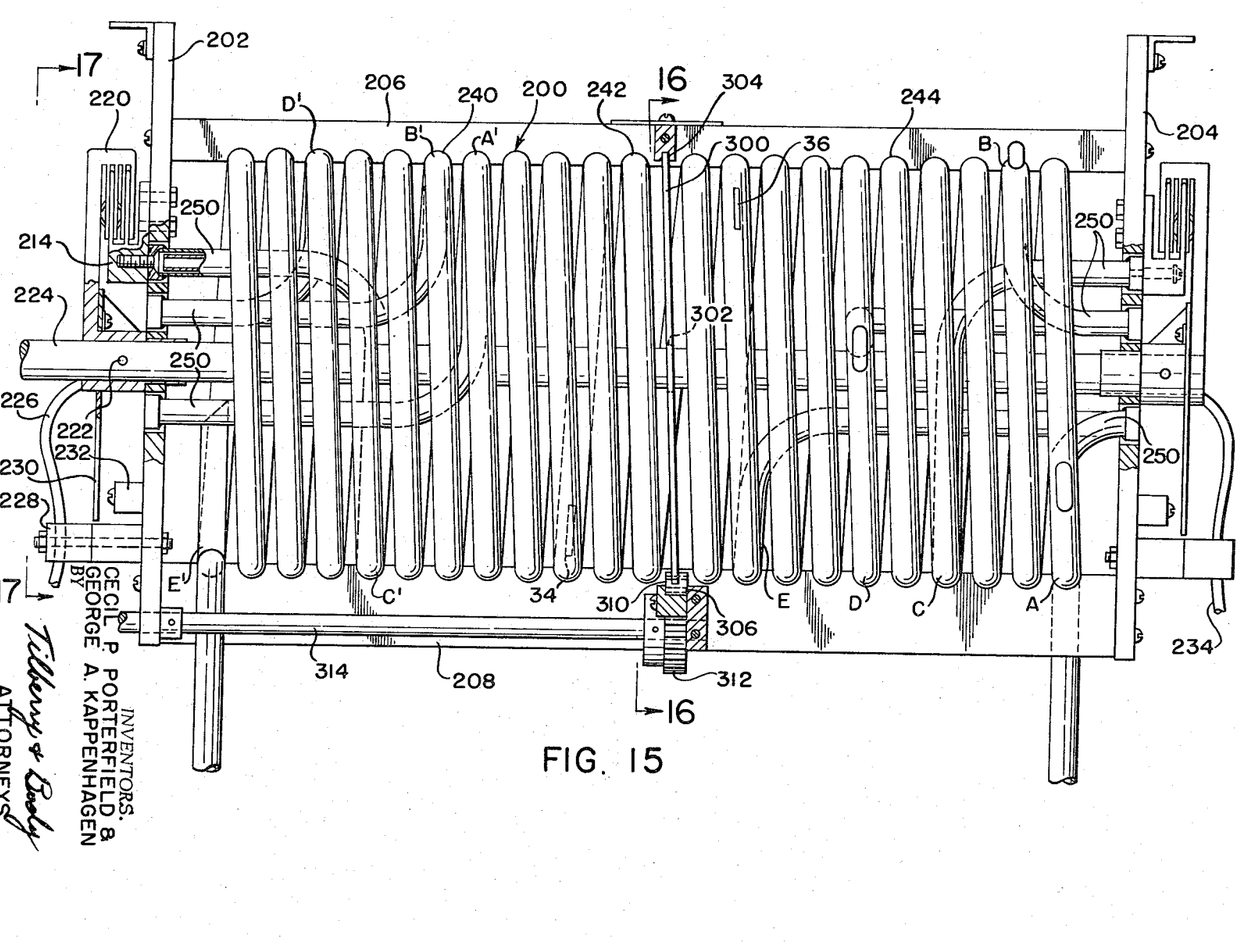
FIGURE 15 is a side elevational view showing, somewhat schematically, one practical embodiment of the present invention.
Figure 16:
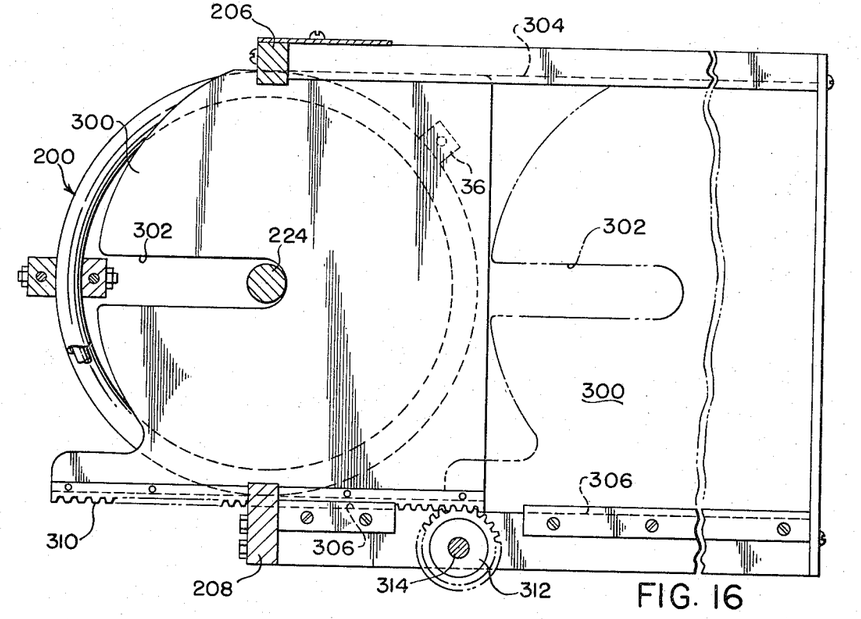
FIGURE 16 is a cross-sectional view taken generally along line 16—16 of FIGURE 15; and, FIGURE 17 is a cross-sectional view taken generally along line 17—17 of FIGURE 15.
Figure 17:
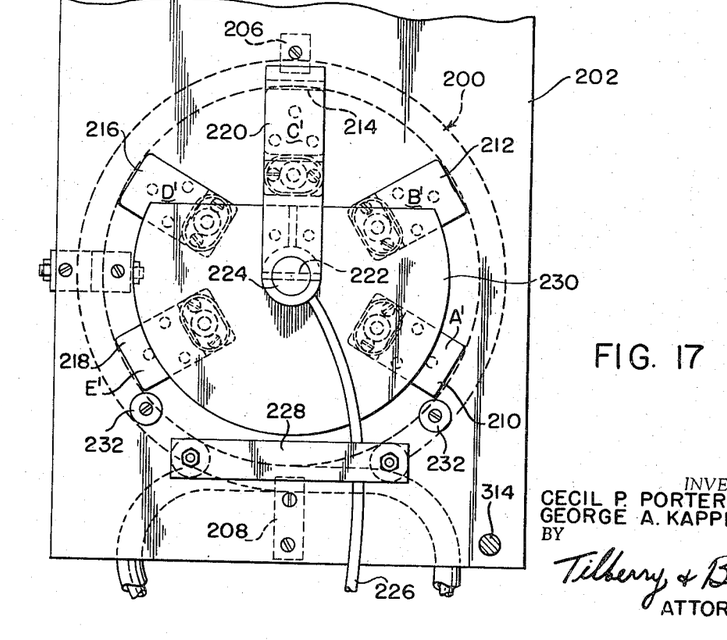

A practical embodiment of the present invention is illustrated in FIGURES 15-17, wherein a coil 200 is supported between end plates 202, 204 which are held in parallel relationship by upper and lower struts 206, 208, respectively. End plate 202 supports fixed connectors 210, 212, 214, 216 and 218 which correspond to taps 68, 66, 64, 62 and 60, as shown schematically in FIGURE 3, and these fixed connectors coact with oscillating connector 220 secured by pin 222 onto rotatable shaft 224. The oscillating connector 220 is electrically connected onto the output transformer or other load, not shown, by cable 226 which is secured onto end plate 202 by bracket 228. A shield 230 extends over the fixed connectors which are not being contacted by oscillating connector 220, as best shown in FIGURE 16. The oscillating movement of connector 220 is limited by stops 232 at the opposite ends of cable bracket 228.

In operation, the connector 220 is moved selectively between the fixed connector 210-218, to electrically connect the desired fixed connector onto the cable 226. The end plate 204 has substantially the same construction as end plate 202; therefore, a detailed description is not necessary. As the shaft 224 moves connector 220, a like oscillating connector adjacent end plate 204 is moved to connect cable 234 onto a corresponding fixed connector on plate 204. In this manner, as will be hereinafter described in detail, the operation of coil 200 is substantially in accordance with the description of the embodiment of the invention as shown in FIGURES 1 and 3.

The cathode terminal 34 and grid terminal 36 divide coil 200 into three sections, 240, 242 and 244, which correspond to $X_{L1}$, $X_{L2}$ and $X_{L3}$, respectively, as shown in FIGURE 1. The amount or length of coil 200 in sections 240 and 244 determines the inductive reactance of those sections. The sections 240, 244 are each provided with a plurality of coil leads 250 each of which is connected at one end onto the fixed connectors and at the opposite end onto coil 200 at different points A, B, C, D and E and A', B', C', D' and E'. Thus, the fixed connectors are each connected onto coil 200 at different points along the length of the coil. Consequently, as different fixed contacts are contacted by oscillating connector 220, the amount of coil turns in sections 240 and 244 is varied. This variation in coil length is selected so that the coil 200 can be used to compensate for different quality factors, Q of the load circuit without changing the operating antiresonant resistance, as viewed from the tube, or the operating frequency of the coil.

In practice, the oscillator tube 10 as shown in FIGURE 1, operates with the tank circuit having an impedance of 735 ohms. The desired frequency is 400 kc. which is to remain substantially constant with widely varying values for the Q of the load circuit. Capacitor 50 has a capacitance of 0.0068 microfarad and, thus, a capacitive reactance of 60 ohms at 400 kc. When the circuit 30 has a quality factor of 35 the inductive branch, i.e. load coil 40 and inductor 42 (which corresponds to section 240 of coil 200 in FIGURE 15), has an inductive reactance of 735/35 or 21 ohms. At 400 kc., 21 ohms requires an inductance of coils 40 and 42 of 8.36 microhenries. In practice the load coil 40 in the primary of a transformer has an inductance of 4.25 microhenries; therefore, the inductance of section 240 of coil 200 must have an effective inductance of 4.1 microhenries. This is accomplished by including three turns in section 240 by connecting cable 226 onto fixed connector 210 which is attached to point A' of coil 200. The three turns actually result in an inductance of approximately 4.1 microhenries.

Since the inductive branch of the tank circuit has an inductive reactance of 21 ohms, the capacitive branch must have a capacitive reactance of 21 ohms. The capacitive reactance of capacitor 50 ($X_{C1}$) is 60 ohms at 400 kc.; therefore, the inductive reactance of coil sections 242 and 244 must equal (60—21) or 39 ohms. At 400 kc., the total inductance of these two coil sections must be 15.5 microhenries. The necessary grid drive voltage must be approximately 1450 volts for the tube 10 used in practice. At $Q=35$, the coil section 242 must have an inductive reactance of 1.9 microhenries to obtain this grid voltage. Consequently, coil section 244 must have 15.5—1.9 or 13.6 microhenries of inductance. By connecting point A of section 244 onto cable 234, 12 turns are included in sections 242 and 244. This results in an inductance of approximately 15.5 microhenries.

When the shaft 224 is rotated to connect coil 200 at points A and A', the tank circuit 30 of the oscillator will have the desired antiresonant resistance and the desired frequency at a quality factor of 35.

As the Q of the load circuit changes, for instance from 35 to 15, the coil 200 is adjusted by moving shaft 224 until points E and E' are simultaneously connected onto cables 226 and 234. The adjustment of the contact point in section 240 automatically adjusts the contact point in section 244 in a manner previously described so that the same antiresonant resistance and operating frequency is maintained as hereinafter described.

At $Q=15$, the inductive branch has an inductive reactance of 735/15, or 49 ohms. This is equivalent to 19.5 microhenries at 400 kc. Knowing that the load has an inductance of 4.25 microhenries (this is from the output transformer used to drive the load) the section 240 (or coil 42 of FIGURE 1) must have an inductance of 15.25 microhenries. This value is obtained by moving oscillating connector 220 to fixed connector 218 so that point E' is connected onto cable 226. This movement of oscillating connector 220 connects point E onto cable 234 at end plate 204, in a manner previously described. The effective capacitive reactance of capacitor 50 and coil sections 242, 244 is to be 49 ohms when point E is connected onto cable 234. Since capacitor 50 has a capacitive reactance of 60 ohms, the coil sections 242 and 244 must have a combined inductive reactance of 11 ohms which requires an inductive reactance of 4.39 microhenries at 400 kc. In order to obtain the necessary grid drive voltage, 4.40 microhenries are needed in section 242; therefore, section 244 has no turns when the Q of the tank circuit is 15.

As the coil 200 is adjusted, it is necessary to adjust the inductance of section 242 between 1.9 microhenries at $Q=35$ and 4.40 microhenries at $Q=15$. There are no adjustable taps in section 242 and the inductance of this section is adjusted by a novel feature of the present invention. Shield 300 with slot 302, see FIGURES 16 and 17, is slidable in slots 304, 306. The lower portion of the plate has a rack 310 coacting with pinion 312 driven by shaft 314 to move transversely with respect to coil 200. As the shield 300 is shifted into and out of the coil, the inductance of section 242 is adjusted in a manner described in connection with FIGURES 3–5.

Throughout this specification a ratio of tube resistance to load resistance of 1 to 1 has been assumed. Obviously the invention is applicable to other ratios as varying tube parameters may from time to time require.

A number of embodiments of the present invention have been set forth for the purpose of illustrating the present invention; however, various structural modifications may be made in these embodiments without departing from the intended spirit and scope of the present invention.

Having thus described our invention, we claim:

1. In an oscillator for an industrial heating apparatus, said oscillator having a tube with a plate, grid and cathode and a tank circuit, said tank circuit including a primarily inductive reactance branch and a primarily capacitive reactance branch, an inductive output load in one of said branches and the plate-cathode circuit of said tube being connected in parallel with each of said branches, the improvement comprising: means for maintaining a substantially constant antiresonant resistance across said plate-cathode circuit of said tube with variations of the Q of said tank circuit, said means including a first inductor in said primarily inductive reactance branch and a second inductor in said primarily capacitive reactance branch, a plurality of taps on said first inductor for changing the amount of additive inductance of said first inductor in said inductive reactance branch, a plurality of taps on said second inductor for changing the amount of subtractive inductance of said second inductor in said capacitive reactance branch, first contact means in said inductive branch and movable from one to the other of said taps on said first inductor, second contact means in said capacitive branch and movable from one to the other of said taps on said second inductor, and means for moving said first and second contact means in coordinated relationship to maintain a substantially constant inductive reactance within said tank circuit as said contact means are shifted to various taps.

2. The improvement as defined in claim 1 wherein said moving means is a mechanical interconnecting element between said first and second contact means.

3. A method for maintaining a substantially constant antiresonant resistance having a value $R_{ar}$ in a tank circuit of an oscillator for an industrial heating installation when the Q of the tank circuit is changed by variations in the electrical characteristics of the heating load, said tank circuit having a first portion which is predominantly inductive reactance and a second portion which is predominantly capacitive reactance, said method comprising the following steps:

(a) adjusting the inductive reactance of the predominantly inductive portion of the tank circuit inversely proportional to the change of Q so that the antiresonant resistance determined by the predominantly inductive portion is substantially $R_{ar}$; and, (b) adjusting the capacitive reactance of the predominantly capacitive reactance portion of the tank circuit proportionally to the change of inductance so that the antiresonant resistance determined by the predominantly capacitive portion is substantially $R_{ar}$.

(References on following page)

References Cited

UNITED STATES PATENTS

| | | | |
|---|---|---|---|
| 1,726,076 | 8/1929 | Kummerer | 331—169 |
| 1,802,767 | 4/1931 | Kummerer | 331—183 X |
| 1,882,684 | 10/1932 | Achard | 331—182 X |
| 1,960,419 | 5/1934 | Schumacher | 331—169 X |
| 2,210,303 | 8/1940 | Polydoroff | 331—169 X |
| 2,769,886 | 11/1956 | Crawford | 219—10.75 X |
| 3,066,210 | 11/1962 | Goetter et al. | 219—10.77 X |

FOREIGN PATENTS

| | | |
|---|---|---|
| 305,508 | 1/1929 | Great Britain. |
| 415,464 | 8/1934 | Great Britain. |

ROY LAKE, *Primary Examiner.*

J. B. MULLINS, *Assistant Examiner.*